June 26, 1962

W. J. STENGER 3,041,410

DELAY BUSY CIRCUIT

Filed Dec. 9, 1959

INVENTOR
W. J. STENGER
BY
J. R. McCorkendale
ATTORNEY 3,041,410

DELAY BUSY CIRCUIT

William J. Stenger, Hawthorne, N.Y., assignor to American Telephone and Telegraph Company, New York, N.Y., a corporation of New York Filed Dec. 9, 1959, Ser. No. 858,458
7 Claims. (Cl. 179—43)

This invention relates to a telephone system including a two-way tie trunk for interconnecting two separated exchanges, and more particularly to a delay busy circuit for use in such a system.

In the modern day business world, where an organization may commonly comprise a main office in one city and branch offices in various other cities, it is the usual practice to interconnect the offices by a private line telephone network. This usually involves the provision of a private branch exchange switchboard (PBX) at the home office and at each of the branch offices, each of the PBX boards being interconnected by means of a two-way tie trunk.

Since, under normal conditions, more calls are made from the main office to the branch offices than in the reverse direction, it frequently happens that the operator at the "home" PBX tends to monopolize the tie trunk in putting through outgoing calls and that, while the tie trunk is capable of, and intended for, two-way service, it is often difficult for a branch office operator or attendant to gain access to the tie trunk due to the practically continuous control of the trunk by the home office operator.

It is an object of the present invention, therefore, to improve the operation of telephone systems utilizing two-way tie trunks.

A more specific object of the invention is to prevent reseizure of the tie trunk by the home office operator for a predetermined interval following the completion of each outgoing call over the tie trunk from the home office.

In accordance with a particular feature of the invention, busy signals, both visual and audible, are set up at the home office switchboard for a predetermined interval following the completion of each outgoing call over the tie trunk; this keeps the home office operator "off the trunk" for the interval, thereby giving the operator at the other end of the trunk a reasonable opportunity to seize the trunk.

In accordance with a further feature of the invention the length of the interval during which the busy signals are applied is readily adjustable.

Figure 1:
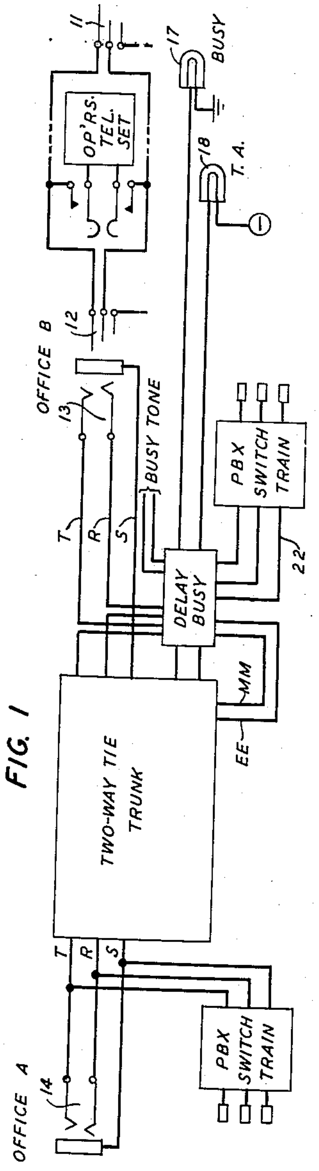
Figure 2:
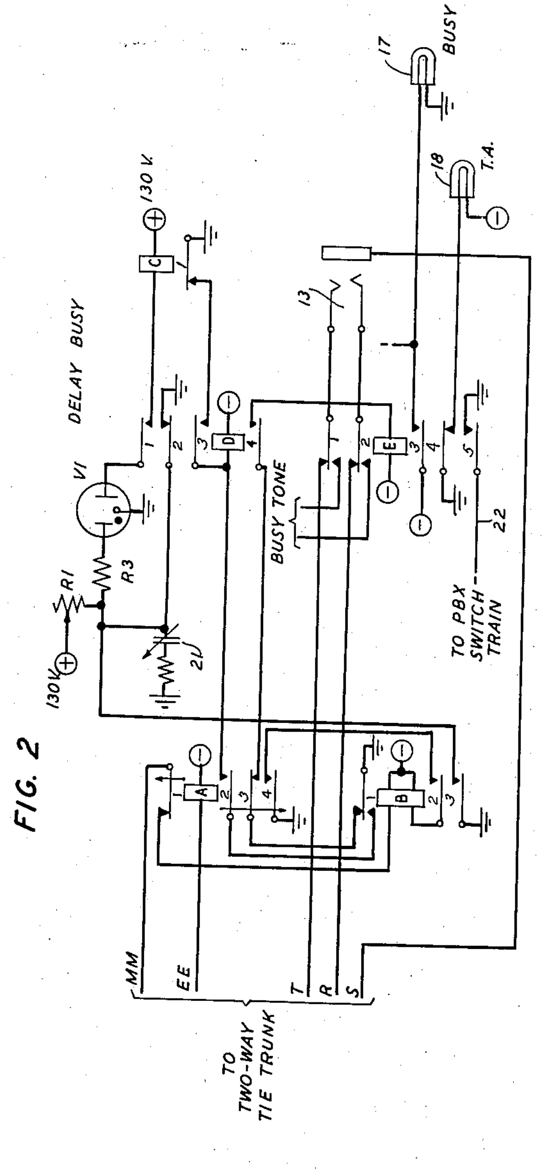

A full understanding of the arrangement contemplated by the present invention, as well as an appreciation of the various advantageous features, may be gained from a consideration of the following detailed description, appended claims and the accompanying drawing in which:

FIG. 1 shows in schematic form a telephone system in which two telephone offices—Office A and Office B—are connected by a two-way tie trunk circuit, the delay busy circuit of the present invention being provided at Office B; and FIG. 2 is a detailed showing of the delay busy circuit.

Referring now to the drawing, and first to FIG. 1, it will be assumed that Office B is the home office PBX and that office A is the PBX of one of the branch offices. The two-way tie trunk circuit is not shown in detail since this type of circuit is well known in the art and a detailed description thereof is not essential to a complete understanding of the invention.

It will be assumed that the operator at Office B has answered a call by one of the PBX subscribers by inserting the answering plug 11 of a cord circuit in the jack connected to the subscriber's line (not shown), and has ascertained that the subscriber wishes to call a subscriber at Office A. Assuming that the tie trunk circuit is not in use, she will seize the trunk by inserting the calling plug 12 of the cord circuit in jack 13. The cord circuit, which is shown only schematically, may be any one of such circuits well known in the art, the exact arrangement being dependent upon the particular installation. Through normal operation of the two-way tie trunk circuit the connection is completed from jack 13 at Office B to Office A and, either directly to the called subscriber through the switch train circuit if a dialed call, or to jack 14 where the call is picked up by the operator at Office A in the usual manner.

Leads MM and EE of the tie trunk circuit are shown separately since certain signals and potentials transmitted at times over these leads, as a part of the normal operations of the tie trunk circuit as a whole, will be described in connection with the operation of the delay busy circuit.

When the tie trunk circuit is seized, busy lamp 17 will be lighted through normal operation of the circuit, and the "trunks available" lamp 18 (if provided) will be extinguished. Also ground is placed on the sleeve of jack 13 and of the multiple jacks so that the circuit will test busy in the usual way while the call is in progress.

The operations thus far described are inherent in the normal functioning of the two-way tie trunk circuit independent of the delay busy circuit.

Referring now to FIG. 2 (a detailed showing of the delay busy circuit), when the tie trunk circuit is seized as above described, ground is placed on lead MM by operation of a relay included in the tie trunk circuit and operating at this time in connection with the normal operation of said tie trunk circuit. This causes operation of relay B over a path from battery, upper winding of relay B, No. 1 contacts of relay A to ground on lead MM. Relay B in operating partially establishes a locking path for itself and for relay D, which paths will be described subsequently, and connects ground from its No. 3 contacts to resistor R3 of the timing circuit in order to prevent gas tube V1 from conducting at this time.

Now, assuming that the call is answered by the subscriber at the distant station, Office A, ground is placed on lead EE by operation of a second relay included in the tie trunk circuit and operating at this time in connection with the normal operation of said tie trunk circuit. This results in operation of relay A over an obvious path.

Operation of relay A completes a locking path for relay B, traced from battery, lower winding and No. 2 contacts of relay B to ground on No. 4 contacts of relay A; relay B is therefore held operated under control of relay A. Operation of relay A also interrupts at its No. 1 contacts the first operating path for relay B through the upper winding thereof, and completes an operating path for relay D traced from battery, operating winding of relay D, No. 2 contacts of relay A, No. 1 make contacts of relay B to ground; relay D operates over this path.

Operation of relay D closes at its No. 1 contacts an obvious path for supply of 130 volts potential to the anode electrode of gas tube V1 of the timing circuit, and provides a locking circuit for itself from battery, winding and No. 3 contacts of relay D to ground on No. 1 contacts of relay C, relay D being held operated over this path under control of relay C. Operation of relay D also removes ground at its No. 2 contacts from the resistors of the timing circuit thereby leaving the timing circuit under control of relay B.

Let us assume now that the call is completed and that the subscriber at Office A disconnects first. When this action takes place, the ground is removed from lead EE in the normal operation of the tie trunk circuit, and relay A thereupon releases.

Relay A upon releasing opens the holding circuit previously traced for relay B; relay B does not release at this time, however, since lead MM still has ground connected thereto and the first operating path for relay B is re-established through the upper winding of relay B and No. 1 contacts of relay A to ground on lead MM.

Release of relay A also interrupts at its No. 2 contacts the operating path previously traced for relay D; relay D does not release at this time, however, being held over the locking path previously traced under control of relay C. The circuit is held in this condition at both ends since the attendant has not yet disconnected and lead MM still has ground connected thereto.

Now, when the attendant disconnects (by removing plug 12 from jack 13) in response to the disconnect signal, ground is removed from lead MM and relay B releases. Relay B in releasing opens the holding path from relay A, and completes an operating path for relay E, traced from battery, winding of relay E, No. 4 contacts of relay D, No. 3 contacts of relay A, No. 1 break contacts of relay B to ground; relay E operates over this circuit.

Release of relay B also disconnects ground from the resistors of the timing circuit (No. 3 contacts of relay B) which now operates as follows: 130-volt potential through adjustable resistor R1 charges variable condenser 21 in a selected optional period, which may be, for example, from 5 seconds to 20 seconds. This period can be adjusted as desired by proper adjustment of variable resistor R1 and variable capacitor 21. After the capacitor 21 has been charged to the required potential (for example 70 volts) in the selected time, gas tube V1 will fire, permitting the flow of current between anode electrode and ground. Relay C will now operate, therefore, with resulting operations which will be described subsequently and which include the release of relay E.

It will be noted from the above that during the selected operating period of the timing circuit, for example, from 5 seconds to 20 seconds as determined by the adjustment of resistor R1 and capacitor 21, relay E remained in operated condition. As the result of the operation of relay E alone, and regardless of the fact that the tie trunk at Office B is not actually in use, the circuit is "made busy" for the selected period in order to keep the operator "off the trunk."

It will be noted, first, that operation of relay E interrupts at its No. 1 and No. 2 break contacts the normal through connection of the tip and ring conductors between the tie trunk and jack 13, and connects busy tone to the jack. Also, operation of relay E completes at its No. 3 contacts an obvious path for energizing "busy" lamp 17 and interrupts at its No. 4 contacts the energizing path for "trunks available" lamp 18 (if supplied), extinguishing the lamp. In addition, ground is applied at the No. 5 contacts to lead 22 of the PBX switch train circuit to mark that lead "busy."

It will be apparent, therefore, that, through the operation of the novel delay busy circuit contemplated by the invention, so long as relay E remains in operated condition busy tone is applied to the jacks of the switchboard, the "busy" lamps are lighted, the "trunks available" lamp (if supplied) is extinguished and the PBX switch train circuit is marked "busy." For this period, therefore, the operator at Office B is "kept off" the trunk circuit, which, however, may be seized by incoming calls. In effect, therefore, relay E by its operation makes the line "busy" for the interval during which it remains operated.

When relay C operates as above described, the holding path through its No. 1 contacts for relay D is interrupted, and relay D releases. Relay D released interrupts at its No. 4 contacts the operating path for relay E which thereupon releases. Also, relay D in releasing connects ground through its No. 2 contacts to the resistors of the timing circuit, thereby disabling the timing circuit for the present, and interrupts at its No. 1 contacts the path to the anode electrode of gas tube V1, thereby releasing relay C.

The release of relay E restores the connections to the switchboard to their normal through condition, removes the visual and audible busy signals, and enables the attendant to again seize the circuit for making an outgoing call in the normal manner.

In the instance described above, if the called party had not answered the call, that is if the call had not been completed, no ground would have been passed on the EE lead. The B relay would not be locked up, therefore, but would release when the attendant pulls down the cord and the delay busy circuit would not function. In the instance of an uncompleted call, therefore, the delay busy circuit does not prevent the attendant from attempting another call immediately after abandoning the uncompleted call.

In the event a call has been completed and the operator at Office B disconnects first, the ground is removed from the MM lead. The A relay is held operated by the ground on the EE lead; when the distant end disconnects, the ground is removed from the EE lead, relay A releases, and the circuit then functions as described above in the instance when the call had been completed and the attendant at Office A disconnected first.

It will be apparent that the novel circuit contemplated by the present invention is effective, following the completion of each outgoing call from Office B, to automatically set up a "busy" condition at that office for a predetermined interval, during which interval the operator is prevented from again seizing the trunk. Incoming calls may be received during the interval in the normal way however. This feature prevents the home operator from monopolizing the circuit in case she has an accumulation of outgoing calls, and assures the distant operator of at least a reasonable opportunity to seize the trunk circuit from time to time for initiation of calls from the distant station. The delay busy circuit functions entirely automatically and without attention on the part of the attendants and is particularly advantageous since no change in operating procedure is entailed.

While a specific embodiment of the invention has been selected for detailed description, the invention is not, of course, limited in its application to the embodiment described. The particular arrangement utilized in any specific instance may be varied to suit the type of central office installation. The embodiment which has been described should be taken as illustrative rather than restrictive thereof.

What is claimed is:

1. In a telephone system, a line terminating at one end in an attendant's position in a central office, means including a relay for making said line busy at said attendant's position for a predetermined interval, means for operating said relay upon termination of a call established over said line from said attendant's position, and means responsive to the operation of said first mentioned means for indicating a busy condition of said line at said attendant's position during said interval.

2. In a telephone system, a line terminating at one end in an attendant's position in a central office, means including a relay for making said line busy at said attendant's position for a predetermined interval, means for operating said relay upon termination of a call established over said line from said attendant's position, means responsive to the operation of said first-mentioned means for indicating a busy condition of said line at said attendant's position, and means for varying the duration of said interval.

3. In a telephone system, a line terminating at one end in an attendant's position in a central office, audible and visual signaling means associated with the line in the central office, means including a relay for making said line busy at said attendant's position for a predetermined interval, means for operating said relay upon termination of a call established over said line from said attendant's position, and means responsive to the operation of said relay including means for rendering said audible and visual signaling means effective to indicate a busy line during said interval.

4. In a telephone system, a line terminating at one end in an attendant's position in a central office, a tone source, a first visual signal for indicating when energized a busy line condition, a second visual signal for indicating when energized an idle line condition, energizing paths for each of said signals, a relay, means for operating said relay and maintaining it operated for a predetermined interval upon termination of a call established over said line from said attendant's position, and means effective while said relay is in operated condition for connecting said tone source to said line, for completing the energizing path of the first of said visual signals, and for interrupting the energizing path of the second of said visual signals.

5. In a telephone system, a line terminating at one end in an attendant's position in a central office, a tone source, a first visual signal for indicating when energized a busy line condition, a second visual signal for indicating when energized an idle line condition, energizing paths for each of said signals, a relay, means for operating said relay and maintaining it operated for a predetermined interval upon termination of a call established over said line from said attendant's position, means for varying the duration of said interval, and means effective while said relay is in operated condition for connecting said tone source to said line, for completing the energizing path of the first of said visual signals, and for interrupting the energizing path of the second of said visual signals.

6. In a telephone system, a line terminating at one end in an attendant's position in a central office, a tone source, a first visual signal for indicating when energized a busy line condition, a second visual signal for indicating when energized an idle line condition, energizing paths for each of said signals, a first relay, an energizing path for said first relay, means for closing said last-mentioned energizing path whereby to operate said first relay upon termination of a call established over said line from said attendant's position, a second relay effective upon operation to interrupt said last-mentioned energizing path to release said first relay, means effective a predetermined interval after the operation of said first relay to cause operation of said second relay, and means effective while said first relay is in operated condition for connecting said tone source to said line, for completing the energizing path of the first of said visual signals, and for interrupting the energizing path of the second of said visual signals.

7. In a telephone system, a line terminating at one end in an attendant's position in a central office, a tone source, a first visual signal for indicating when energized a busy line condition, a second visual signal for indicating when energized an idle line condition, energizing paths for each of said signals, a first relay, an energizing path for said first relay, means for closing said last-mentioned energizing path whereby to operate said first relay upon termination of a call established over said line from said attendant's position, a second relay effective upon operation to interrupt said last-mentioned energizing path to release said first relay, means effective a predetermined interval after the operation of said first relay to cause operation of said second relay, said last-mentioned means including a gas-filled tube in series with the energizing path of said second relay and means for firing said tube to complete the last-mentioned energizing path, and means effective while said first relay is in operated condition for connecting said tone source to said line, for completing the energizing path of the first of said visual signals, and for interrupting the energizing path of the second of said visual signals.

References Cited in the file of this patent

UNITED STATES PATENTS

| | | |
|---|---|---|
| 1,593,806 | Mellinger | July 27, 1926 |
| 2,713,089 | Pharis | July 12, 1955 |